Figure 1:
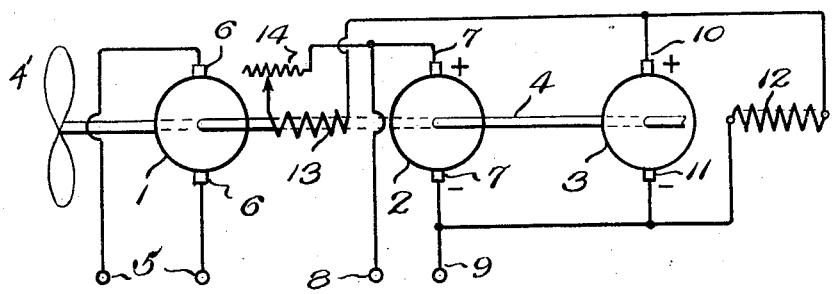

Dec. 2, 1930.   F. B. MONAR   1,783,745

CONSTANT VOLTAGE GENERATOR

Filed May 11, 1927

Patented Dec. 2, 1930

1,783,745

UNITED STATES PATENT OFFICE

FRED B. MONAR, OF WASHINGTON, DISTRICT OF COLUMBIA

CONSTANT-VOLTAGE GENERATOR

Application filed May 11, 1927. Serial No. 190,562.

(GRANTED UNDER THE ACT OF MARCH 3, 1883, AS AMENDED APRIL 30, 1928; 370 O. G. 757)

My invention relates broadly to generators and more particularly to generators used to supply current to radio apparatus used on airplanes.

The object of my invention is to produce a generator that will deliver current to the radio apparatus at a constant voltage irrespective of the speed at which the generator is being driven.

Further objects of my invention will appear more fully hereinafter as the description of the method and apparatus is developed.

One of the principal difficulties encountered in the use of radio apparatus upon airplanes has been the securing of a source of constant voltage power. Several systems have been developed in the attempt to maintain constant voltage of the generators, such as the "third brush" type of generator, the field regulator, etc., but these types of generators have been found to be unsatisfactory for the reason that the range of speeds of the generators under airplane operation conditions is larger than can be compensated for by these methods.

In the generator system that I have developed it is possible to maintain a constant output voltage even though the speed of the generator is double that of the normal operating speed.

My invention consists substantially in the construction, combination and arrangement of parts associated therewith or as will be more fully hereinafter set forth as shown by the accompanying drawings and finally pointed out in the appended claims.

Figure 2:
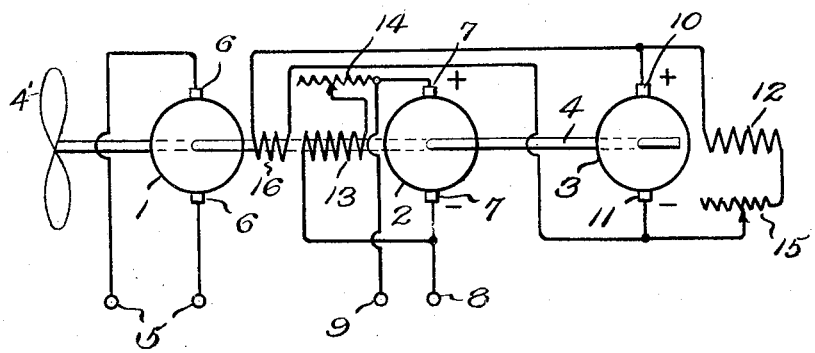

Reference is to be had to the accompanying drawings forming a part of this specification in which like reference characters indicate corresponding parts throughout the several views and in which:

Figure 1 is a diagrammatic circuit diagram of one form of my improved generator, and Figure 2 is a modification thereof.

Referring particularly to Figure 1, numerals 1, 2 and 3 represent the commutators of the three armatures mounted upon a single shaft 4, or driven at similar speeds through any well known means such as a wind driven propeller 4' or other type of prime mover. These armatures may be designated as the main generator, exciter and bucking generator respectively. The terminals 5 from the brushes 6 on commutator 1 constitute the output terminals of the system for the production of a current of constant voltage.

The brushes 7 of commutator 2 supply current for the excitation of the field of the main generator. I have found that it is also possible to supply current to the filaments of the vacuum tubes of the radio apparatus from this excitation current. For this supply, connection is made directly to the wires 8 and 9.

Across the terminals of the brushes 10 and 11 of the commutator 3 is connected the field coil 12 of the supplemental bucking generator. The negative brush 11 of the commutator 3 is directly connected to the negative brush 7 of the commutator 2. The positive brush 10 of the bucking generator is connected through the field coil 13 of the main and exciter generators and a variable resistance 14 to the positive brush 7 of the commutator 2.

Referring to Figure 2 numerals 1, 2 and 3 represent the commutators of three armatures mounted upon a single shaft 4, or driven at similar speeds through any well known means. The terminals 5 from the brushes 6 on commutator 1 constitute the output terminals of the system for the production of a current of constant voltage.

The brushes 7 of commutator 2 supply current for the excitation of the common field of the main and exciter generators with a variable resistance 14 in series therewith. In the same manner as shown in Figure 1, it is possible to supply current to the filaments of the vacuum tubes of the radio apparatus by means of wires 8 and 9.

Across the terminals of the brushes 10 and 11 of the commutator 3 is connected the field of the bucking generator with a variable resistance 15 in series therewith. In parallel with the field of the supplemental generator and closely interwound with the field 13 of the main and exciter generators is a winding 16. This is accomplished through connection of the terminals 7 to the winding 13, which constitutes the field winding for both the main generator and the exciter generator 2.

In both types of the generators shown, the field poles of generators 1 and 2 should be fully saturated at normal operating speed. The field poles of generator 3 should be undersaturated to such an extent that the field will not become saturated even though the speed of the system is doubled. With these conditions prevailing should the speed of the generator be raised above the normal operating speed, a bucking effect is produced upon the fields of the generators 1 and 2 by the voltage of the current generated by the generator 3. Should the only increase in voltage in generators 1 and 2 be obtained from the increase of speed, their field poles being fully saturated, and should the increase in voltage of the generator 3 be from the increase in speed multiplied by a factor due to the fact that its field is not saturated the equations of the system would be, for the generators 1 and 2 $E=4.44\ n\ \phi\ f\ 10^{-8}$ volts, where $\phi$ has reached its maximum, and for generator 3 the equation would be $E=4.44\ n\ \phi\ f\ 10^{-8}$ volts where $\phi$ will increase as the speed of the unit increases. This is accomplished through connection of the terminals 7 to the winding 13, which constitutes the field winding for both the main generator 1 and the exciter generator 2.

With the generators arranged as indicated should there be any increase in speed of the unit the voltage of generator 3 will increase very much faster than the voltage of generators 1 and 2 since the fields of generators 1 and 2 are fully saturated and the field of generator 3 is undersaturated. It will be seen therefore, that as the speed of the system increases, the voltage delivered by generator 3 will tend to decrease the flux in the field poles of the generators 1 and 2. After the normal operating speed is reached the relation between the generated voltage and the speed should be such that the bucking effect of generator 3 is sufficiently great to overcome the increase of generator 3 due to the increase in speed of the unit.

It will be understood that the above description and accompanying drawings comprehend only the general and preferred embodiment of my invention and that minor detail changes in the construction and arrangement of parts may be made within the scope of the appended claims without sacrificing any of the advantages of my invention.

The invention herein described may be manufactured and used by or for the Government of the United States for governmental purposes without the payment to me of any royalty thereon or therefor.

Having thus described my invention, what I claim is as follows:

1. In a radio generator, the combination of a main generator, an exciter generator therefor, said main generator and exciter generator having common field poles that are saturated at normal operating speed, and a supplemental generator, having a field pole that is undersaturated at normal operating speed, the output of said supplemental generator connected to a field winding upon the field pole of the exciter generator, the said field winding being wound upon said field pole of the exciter generator in such a manner that the flux of said winding opposes the field pole flux of the main and exciter generators for maintaining the output voltage of the main generator constant irrespective of increase in speed above normal operating speed.

2. In a radio generator, the combination of a main generator, an exciter generator therefor, said main generator and exciter generator having common field poles that are saturated at normal operating speed, and a supplemental generator having a field pole that is undersaturated at normal operating speed, the output of said supplemental generator being connected to a field winding upon the common field pole of the main and exciter generators for maintaining the output voltage of the main generator constant, irrespective of increase in speed above the normal operating speed, the last mentioned field winding being wound upon the said common field pole of the main and exciter generator in such a manner that the flux of said winding opposes the flux of the main generator and exciter generator winding.

3. In a system for generating electrical energy at substantially constant voltage a generator having a normally saturated field, a second generator revolvable at a speed bearing a constant relationship to the speed of said first-named generator, a field unaffected by saturation for said second generator, and means for creating a magnetizing force from the output of said second generator to differentially control the field of said first-named generator.

FRED B. MONAR.